(12) United States Patent
Falkenstein

(10) Patent No.: US 9,180,768 B2
(45) Date of Patent: Nov. 10, 2015

(54) METHOD FOR OPERATING A HYBRID DRIVE DEVICE

(75) Inventor: Jens-Werner Falkenstein, Aalen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1043 days.

(21) Appl. No.: 12/810,692

(22) PCT Filed: Nov. 12, 2008

(86) PCT No.: PCT/EP2008/065348
§ 371 (c)(1),
(2), (4) Date: Oct. 13, 2010

(87) PCT Pub. No.: WO2009/083325
PCT Pub. Date: Jul. 9, 2009

(65) Prior Publication Data
US 2011/0035085 A1    Feb. 10, 2011

(30) Foreign Application Priority Data

Dec. 27, 2007  (DE) .......................... 10 2007 062 796

(51) Int. Cl.
*B60W 10/02* (2006.01)
*B60W 20/00* (2006.01)
(Continued)

(52) U.S. Cl.
CPC .................. *B60K 6/48* (2013.01); *B60W 10/02* (2013.01); *B60W 10/08* (2013.01); *B60W 30/192* (2013.01); *B60L 2240/421* (2013.01); *B60L 2240/423* (2013.01); *B60L 2240/441* (2013.01); *B60L 2240/445* (2013.01); *B60L 2240/486* (2013.01); *B60W 20/00* (2013.01); *B60W 2510/0638* (2013.01); *B60W 2510/0652* (2013.01); *B60W 2510/0676* (2013.01); *B60W 2510/0695* (2013.01); *B60W 2510/081* (2013.01); *B60W 2710/027* (2013.01); *B60W 2710/083* (2013.01); *B60W 2710/105* (2013.01); *F02D 2200/023* (2013.01); *F02D 2200/1012* (2013.01); *F02D 2250/21* (2013.01); *F02N 11/0814* (2013.01); *F02N 11/0851* (2013.01);
(Continued)

(58) Field of Classification Search
CPC .............. B60W 2510/0241; B60W 2710/027; B60K 6/48; Y02T 10/6221; F02N 19/00
See application file for complete search history.

(56) References Cited

U.S. PATENT DOCUMENTS 5,383,824 A * 1/1995 Runge et al. .................. 477/110
5,558,178 A * 9/1996 Hess et al. .................... 180/197
(Continued)

FOREIGN PATENT DOCUMENTS

DE    40 37 092    5/1992
DE    42 39 711    6/1994
(Continued)

*Primary Examiner* — Khoi Tran
*Assistant Examiner* — Dale Moyer
(74) *Attorney, Agent, or Firm* — Kenyon & Kenyon LLP

(57) ABSTRACT

A method for operating a hybrid drive device, in particular for a motor vehicle, which has at least one combustion engine and at least one electric machine, the combustion engine and the electric machine being mechanically and operatively connectible to each other by a separating clutch, and a slip torque transmitted by the separating clutch being ascertained. There is a provision for the slip torque to be determined as a function of the speed characteristic of a drive shaft of the combustion engine at least when starting and/or stopping the combustion engine and to be taken into account when operating the hybrid drive device.

18 Claims, 4 Drawing Sheets

(51) Int. Cl.

| | |
|---|---|
| *F02N 11/02* | (2006.01) |
| *B60K 6/48* | (2007.10) |
| *B60W 10/08* | (2006.01) |
| *B60W 30/192* | (2012.01) |
| *B60W 50/02* | (2012.01) |
| *B60W 30/18* | (2012.01) |
| *F02N 11/08* | (2006.01) |

(52) U.S. Cl.
CPC .. *F02N 2300/104* (2013.01); *F16D 2500/1066* (2013.01); *F16D 2500/3065* (2013.01); *F16D 2500/30421* (2013.01); *F16D 2500/5108* (2013.01); *Y02T 10/6221* (2013.01); *Y02T 10/642* (2013.01)

(56) References Cited

U.S. PATENT DOCUMENTS

| | | | | |
|---|---|---|---|---|
| 5,679,091 | A * | 10/1997 | Salecker et al. | 477/86 |
| 5,890,992 | A * | 4/1999 | Salecker et al. | 477/86 |
| 5,941,925 | A * | 8/1999 | Hess et al. | 701/91 |
| 6,018,198 | A * | 1/2000 | Tsuzuki et al. | 290/17 |
| 6,081,042 | A * | 6/2000 | Tabata et al. | 290/45 |
| 6,364,807 | B1 * | 4/2002 | Koneda et al. | 477/5 |
| 2003/0088343 | A1 * | 5/2003 | Ochiai et al. | 701/22 |
| 2004/0157704 | A1 * | 8/2004 | Stork et al. | 477/166 |
| 2005/0256626 | A1 * | 11/2005 | Hsieh et al. | 701/67 |
| 2006/0243501 | A1 * | 11/2006 | Hidaka | 180/65.1 |
| 2007/0056784 | A1 * | 3/2007 | Joe et al. | 180/65.2 |
| 2007/0080005 | A1 * | 4/2007 | Joe | 180/65.2 |
| 2008/0183372 | A1 * | 7/2008 | Snyder | 701/105 |
| 2008/0275624 | A1 * | 11/2008 | Snyder | 701/104 |
| 2009/0011899 | A1 * | 1/2009 | Reuschel | 477/5 |
| 2009/0017988 | A1 * | 1/2009 | Reuschel | 477/167 |
| 2009/0105038 | A1 * | 4/2009 | Weiss et al. | 477/5 |
| 2009/0118914 | A1 * | 5/2009 | Schwenke et al. | 701/51 |
| 2011/0040433 | A1 * | 2/2011 | Steuernagel | 701/22 |

FOREIGN PATENT DOCUMENTS

| | | |
|---|---|---|
| DE | 195 04 935 | 8/1995 |
| DE | 10 2006 00864 | 8/2007 |
| EP | 1 505 309 | 2/2005 |
| EP | 2 008 899 | 12/2008 |

* cited by examiner

METHOD FOR OPERATING A HYBRID DRIVE DEVICE

FIELD OF THE INVENTION

The present invention relates to a method for operating a hybrid drive device, in particular for a motor vehicle, which has at least one combustion engine and at least one electric machine, the combustion engine and the electric machine being mechanically and operatively connectible to each other by a separating clutch, and a slip torque transmitted by the separating clutch being ascertained.

BACKGROUND INFORMATION

From the related art, a multitude of methods are known by now for operating a hybrid drive device, which has at least one combustion engine and at least one electric machine. In such hybrid drive devices, the combustion engine and the electric machine are normally mechanically and operatively connectible to each other by a separating clutch. In the so-called parallel hybrid, the drive shaft of the combustion engine and an input shaft of the electric machine are operatively connected to each other by the separating clutch. The vehicle control system is able to influence the separating clutch. In addition to the operating modes, hybrid driving, boost operating mode and recuperation, an appropriate actuation of the separating clutch also allows for purely electric driving, the separating clutch being open in the latter case and the combustion engine normally being switched off or stopped. Using the vehicle control system, it is possible to influence the torque or slip torque currently transmitted by the separating clutch in the slip state, for example by adjusting the contact pressure on clutch friction linings. When the slip torque occurs, the electric machine and the combustion engine run at different speeds such that there exists a slip in the separating clutch. A specified slip torque seldom corresponds to the slip torque actually transmitted by the separating clutch since varying coefficients of friction of the clutch linings produce inaccuracies in the control as a result of wear or temperature changes, hydraulic or mechanical inaccuracies in the actuation system of the separating clutch, hystereses, signal propagation times, aging and similar processes. The time at which a torque begins to be transmitted when closing the separating clutch is therefore also associated with uncertainties.

The actually transmitted slip torque, however, is important for operating the hybrid drive device. In particular when starting the combustion engine from the state of pure electric driving, which occurs by closing the separating clutch while driving, that is, while the electric machine is rotating and the combustion engine is initially at a standstill, the combustion engine is tow-started via the separating clutch. The electric machine, which acts on the drive wheels of the motor vehicle directly or via a transmission, is affected by the transmitted slip torque when closing the separating clutch. This may result in a drop in the speed of the electric machine. In addition, when the combustion engine is started for example, the combustion engine speed may be overshot as a result of the first ignition, which results in a temporary increase of the speed of the electric machine. This affects the rest of the drive train and in particular the drive wheels, which impairs the driving comfort. Knowing the transmitted slip torque, however, would make it possible, among other things, to compensate for or prevent such influences.

For detecting the actually transmitted slip torque, it is known for example to measure it with the aid of an appropriate torque sensor. This is expensive, however, and requires a corresponding installation space.

SUMMARY OF THE INVENTION

The method according to the present invention provides for the slip torque to be determined as a function of the speed characteristic of a drive shaft, in particular a crankshaft, of the combustion engine at least when starting and/or stopping the combustion engine and to be taken into account when operating the hybrid drive device. In particular when starting the combustion engine, the speed of the drive shaft of the combustion engine is decisively influenced by the slip torque. The speed characteristic of the drive shaft of the combustion engine thus allows for an inference to the transmitted slip torque. The slip torque thus ascertained may then be taken into account accordingly when operating the hybrid drive device. The method according to the present invention makes it possible to determine the slip torque in a particularly simple manner, it being possible to use already existing speed sensors for this purpose. The speed characteristic of the drive shaft of the combustion engine may be ascertained for example directly on the drive shaft or on the camshaft, but may also be ascertained on the basis of the speed of an ancillary unit.

Advantageously, an angular velocity and/or an angular acceleration are determined from the speed characteristic of the drive shaft of the combustion engine. For the purpose of ascertaining whether a slip torque exists, the speeds (of the drive shaft) of the combustion engine and the electric machine may be compared to each other. Once a specifiable speed difference limit value is reached, a slip is assumed to exist in the separating clutch.

According to a further development of the exemplary embodiments and/or exemplary methods of the present invention, the slip torque is determined as a function of an acceleration torque effected by the mass inertia of accelerated masses of the combustion engine. The mass inertia of the masses accelerated in the combustion engine, such as the mass inertia of the drive shaft, of a flywheel and/or of pistons of the combustion engine for example, has an effect particularly when starting the combustion engine. The acceleration torque effected by the accelerated masses thus forms a part of the slip torque transmitted by the separating clutch to the combustion engine when starting, which affects the speed characteristic of the drive shaft of the combustion engine.

There is a further provision for the slip torque to be determined as a function of a compression torque of the combustion engine. When starting the drive shaft of the internal combustion engine, compressions occur accordingly in the individual cylinders, which also influence the slip torque of the separating clutch or the speed characteristic. In particular, the first cylinders to compress are responsible for the compression torque of the combustion engine. Shortly after starting the drive shaft of the combustion engine, the compression torque drops substantially since the subsequent cylinders use the energy released in the decompressions of the previous cylinders for their compression.

There is a further provision for the slip torque to be determined as a function of a torque loss of the combustion engine. The torque loss of the combustion engine, in particular when turning the drive shaft, that is, in an overrun condition, is produced by internal mechanical frictions and by charge exchange losses in the combustion engine. It depends on current operating parameters of the combustion engines such as the temperature of a lubricating oil of the combustion engine or an intake manifold pressure for example. The torque loss is advantageously stored via the angular velocity in a characteristics map (of a control unit of the hybrid drive device). For this purpose, the other operating parameters (e.g. oil temperature) may likewise be taken into account. The torque loss must thus be ascertained prior to the initial operation of the hybrid drive device and then be stored in the characteristics map. An adaptation in operation is advantageous.

According to a further development of the exemplary embodiments and/or exemplary methods of the present invention, the slip torque is determined from the sum of the acceleration torque, the compression torque and the torque loss. The acceleration torque, the compression torque and the torque loss respectively affect the speed characteristic and respectively form a part of the slip torque.

In an advantageous development of the exemplary embodiments and/or exemplary methods of the present invention, the determined or ascertained slip torque is taken into account in such a way that it is compensated by the electric machine. Because the slip torque is now determined accurately, it is possible to compensate for the slip torque acting on the drive train and transmitted by the separating clutch by controlling the electric machine accordingly. For this purpose, the electric machine expediently has the slip torque added to it in addition to a torque desired by the driver. In a pure electric driving operation, the combustion engine may thus be started particularly comfortably since, because of the compensation by the electric machine, this does not affect the drive wheels of the motor vehicle for example.

Alternatively or additionally, the determined slip torque is advantageously taken into account in such a way that the separating clutch is controlled as a function of the determined slip torque. Since it is now possible to determine the slip torque accurately using the advantageous method, it is expedient if the separating clutch is controlled accordingly such that the specified slip torque to be transmitted is set or is able to be set with corresponding accuracy. Adaptation mechanisms for the control or for an actuation system of the separating clutch are thus supported particularly advantageously.

Finally, there is a provision for the determined slip torque to be taken into account in such a way that the functioning of the separating clutch is checked on the basis of the determined slip torque. For diagnostic/monitoring purposes, the slip torque determined with sufficient accuracy now makes it possible to detect faults in the actuation system or in the control of the separating clutch. For this purpose, the determined slip torque is advantageously compared with a reference torque that is based on variables ascertained directly on the separating clutch.

The present invention will be explained in greater detail in the following with reference to some figures.

DETAILED DESCRIPTION

Figure 1:
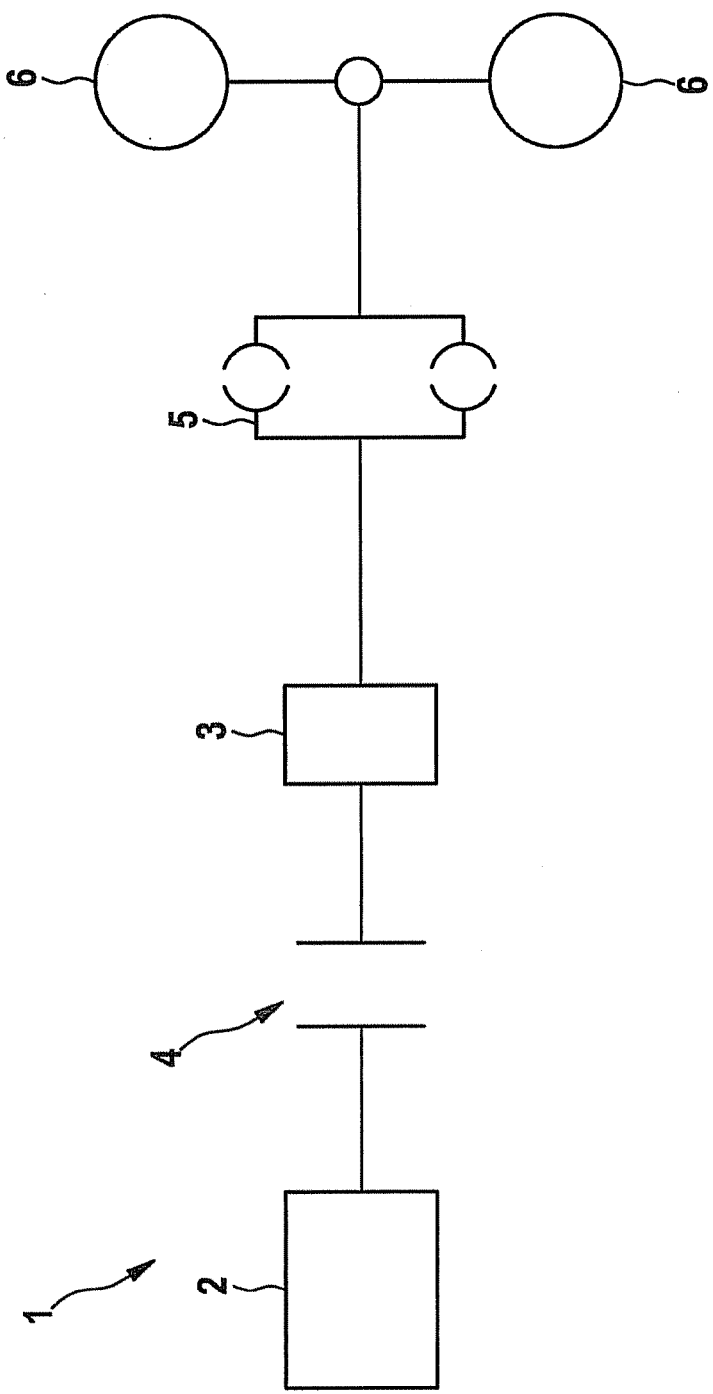
FIG. 1 shows a hybrid drive device of a motor vehicle in a schematic representation.

In a schematic representation, FIG. 1 shows an exemplary embodiment of a hybrid drive device 1 in the form of a parallel hybrid. Hybrid drive device 1 has a combustion engine 2 and an electric machine 3, which are mechanically and operatively connectible to each other by a separating clutch 4. In this case, the drive shaft of combustion engine 2 in the form of a crankshaft is operatively connectible to a rotor shaft of electric machine 3 via separating clutch 4. Electric machine 3 is furthermore mechanically and operatively connected to a torque converter, which is a part of an automatic transmission not shown here, via which drive wheels 6 of the motor vehicle are driven. In a pure electric driving operation, separating clutch 4 is open, as shown in FIG. 1, such that it transmits no torque to combustion engine 2. Furthermore, combustion engine 2 is at a standstill in a pure electric driving operation. Electric machine 3 produces a drive torque, which in pure electric driving is specified in such a way that the drive torque of the electric machine corresponds to a desired torque specified by the driver (or by a driver assistant system, ESP or transmission interventions in gear changes and the like). The entire component of the drive torque of the electric machine acts on the drive train in the direction of drive wheels 6. An optional lockup clutch of torque converter 5 should advantageously be open when combustion engine 2 is started. From the pure electric driving operation, combustion engine 2 is started by closing separating clutch 4 while driving, that is, while electric machine 3 is rotating and combustion engine 2 is initially at a standstill.

Figure 2:
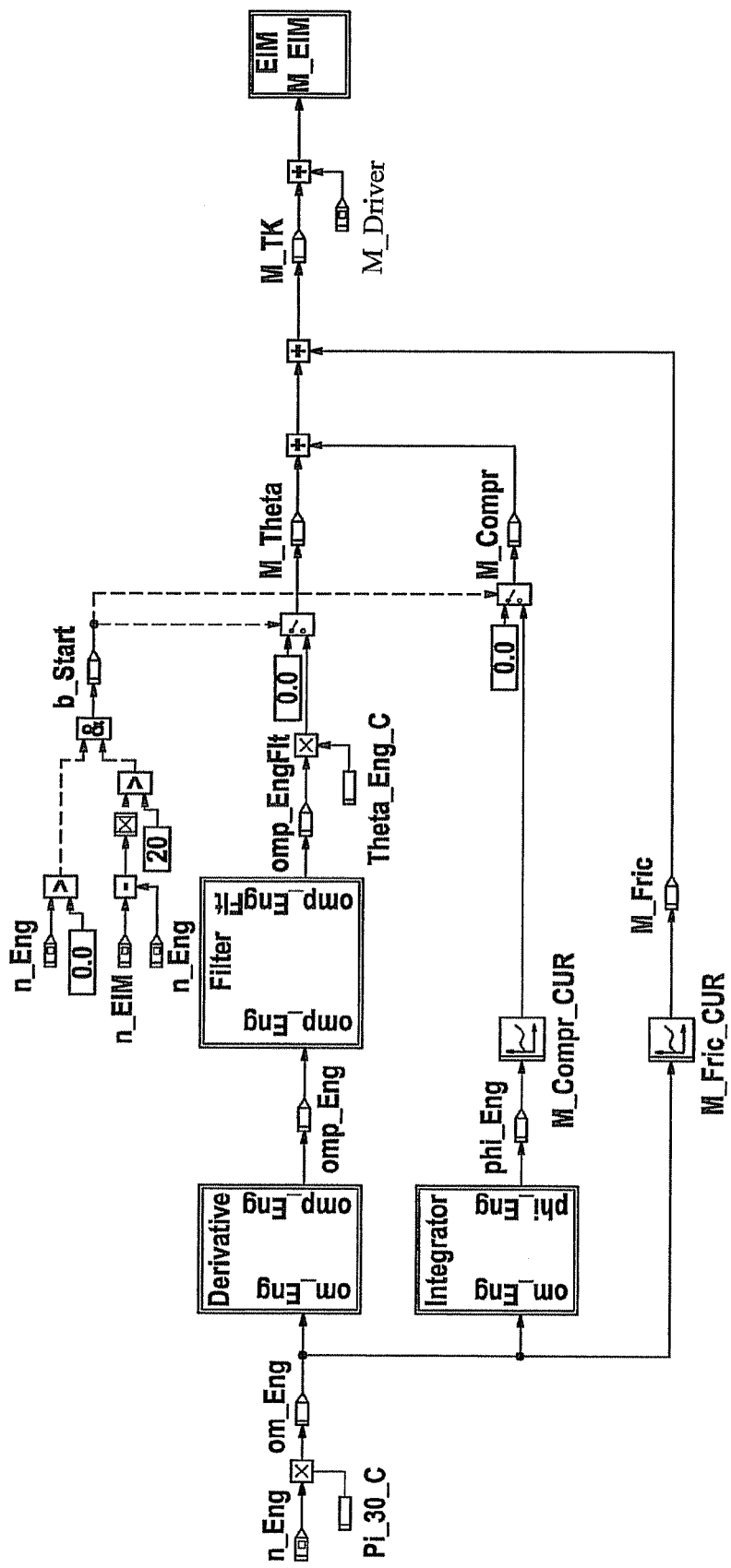
FIG. 2 shows an exemplary embodiment of the advantageous method for operating the hybrid drive device of FIG. 1.

An exemplary embodiment of the advantageous method for operating hybrid drive device 1 will now be explained with reference to FIGS. 2, 3 and 4. For this purpose, FIG. 2 schematically shows a computation procedure for ascertaining a slip torque M_TK currently transmitted by separating clutch 4 during a start of combustion engine 2. As already stated, combustion engine 2 is started by closing separating clutch 4 during a pure electric driving operation. The measured speeds n_Eng of combustion engine 2 and n_ElM of electric machine 3 (in rpm) are used as input variables in the computation. A logical signal b_Start indicates an active start of combustion engine 2. The signal is "true" as soon as combustion engine 2 has started (n_Eng>0) and as long as the absolute value of the speed difference between electric machine 3 and combustion engine 2 is greater than a specifiable threshold, which in this exemplary embodiment is 20 revolutions per minute (n_ElM−n_Eng>20 rpm).

Speed n_Eng of combustion engine 2 (in rpm) is first converted into an angular velocity om_Eng (in rad/s) using the constant multiplication factor Pi_30_C. A "derivative" block differentiates the angular velocity om_Eng and forms angular acceleration omp_Eng of combustion engine 2. The differentiation of a measured variable usually increases signal noise. For this reason, it is followed by a "filter" block, which performs a first order filtering (PT1) and ascertains a filtered angular acceleration omp_EngFlt of combustion engine 2.

When starting combustion engine 2, filtered angular acceleration ompEngFlt should quickly approximate unfiltered angular acceleration omp_Eng. For this purpose, when starting, filtered angular acceleration omp_EngFlt is advantageously initialized to a start value of omp_Eng averaged over multiple starting attempts and stored in the control system. The initialization occurs with the rising edge of signal b_Start.

From filtered angular acceleration omp_EngFlt, torque M_Theta required for acceleration is computed by multiplication with the reduced (converted for the crankshaft) mass inertia Theta_Eng_C of masses accelerated in combustion engine 2 such as the flywheel, crankshaft, pistons, ancillary units and the like). This torque forms a part of the slip torque M_TK transmitted by separating clutch 4 to combustion engine 2 when starting.

When starting combustion engine 2, compressions occur in its individual cylinders: The cylinders compressing first, directly after the start, require a higher torque since usually there is ambient pressure in the intake manifold and thus a high charge. The following cylinders then utilize the energy released in the decompressions of the preceding (initially compressed) cylinders for their compressions. Thus an additional compression torque M_Compr is required directly after the start, which drops shortly after the start.

A modeling of this compression torque from the absolute start rotational angle and the characteristic curve of the absolute rotational angle of combustion engine 2 or its crankshaft during the start and the charge (for example from the measured intake manifold pressure or the cylinder pressure) is most favorable. The exemplary embodiment assumes that no absolute rotational angle signal is available. For the sake of simplicity, the influence of the current charge is neglected. It is assumed that the characteristic curve of compression torque M_Compr over the relative rotational angle behaves similarly in different starts. Relative rotational angle phi_Eng is incremented beginning with the start of the combustion engine. In the exemplary embodiment, an initialization to phi_Eng=0 is performed in the "integrator" block while the combustion engine is at a standstill. Beginning with the start, the relative rotational angle phi_Eng is ascertained by integration of angular velocity om_Eng and rises. The characteristic curve of compression torque M_Compr over relative rotational angle phi_Eng is stored in a characteristics map M_Compr_CUR.

In addition, a breakaway torque, which is required to overcome the static friction or the mixed friction when the oil pressure is low, may be reproduced using the rotational angle-dependent compression torque M_Compr.

The third component of torque M_TK transmitted by the separating clutch to the combustion engine when starting is formed by a speed-dependent or angular velocity-dependent torque loss M_Fric, which is produced by essentially internal mechanical friction and the charge exchange losses of combustion engine 2. The characteristic curve of torque loss M_Fric over angular velocity om_Eng is stored in a characteristics map M_Fric_CUR. For the sake of simplicity, a dependence on additional parameters, such as the oil temperature for example, is not taken into account in the exemplary embodiment shown in FIG. 2. In contrast to rotational angle-dependent compression torque M_Compr, which is produced by effects when starting combustion engine 2, torque loss M_Fric acts when combustion engine 2 is already rotating and amounts to M_Fric=0 Nm when combustion engine 2 is standing still. The three components, torque M_Theta required for acceleration, compression torque M_Compr, and torque loss M_Fric are added to form slip torque M_TK transmitted by separating clutch 4.

In the exemplary embodiment, slip torque M_TK is compensated by electric machine 3 when starting, i.e., when starting, torque M_ElM of electric machine 3 is composed in sum of the torque desired by the driver M_Driver and slip torque M_TK.

An adaptation of compression torque M_Compr and torque loss M_Fric is advantageous, e.g. by evaluating the characteristic curve of speed n_ElM in electric machine 3 in the starts. The characteristic curve of n_ElM while starting combustion engine 2 may be analyzed for adapting the compression torque, while the characteristic curve after the start may be analyzed for adapting the torque loss. A decrease of n_ElM in active compensation means for example that the compression torque or torque loss stored in the control system is too small and must be increased by adaptation. For achieving a high accuracy of adaptation, the speed ratios on torque converter 5 may be analyzed as well. Also advantageous is an adaptation of the start value, stored in the control system, for the initialization of filtered angular acceleration omp_EngFlt when starting.

The adaptations are possible because in the exemplary embodiment the slip torque M_TK, ascertained in accordance with the exemplary embodiments and/or exemplary methods of the present invention, is compensated by electric machine 3 and there is thus a feedback effect on speed n_ElM in electric machine 3. The adaptations result in a comfortable driving behavior and additionally improve the accuracy in the determination of slip torque M_TK.

Before and after the start (signal b_Start="false"), compression torque M_Compr and the torque M_Theta required for acceleration are set to zero. When the combustion engine is at a standstill, the torque loss is M_Fric=0 Nm. The torque produced in the first ignitions of combustion engine 2 as a result of the combustions is additionally included in the computation of slip torque M_TK transmitted by separating clutch 4 in order to achieve a correct compensation. A corresponding computation inclusion point is not shown in FIG. 2.

Figure 3:
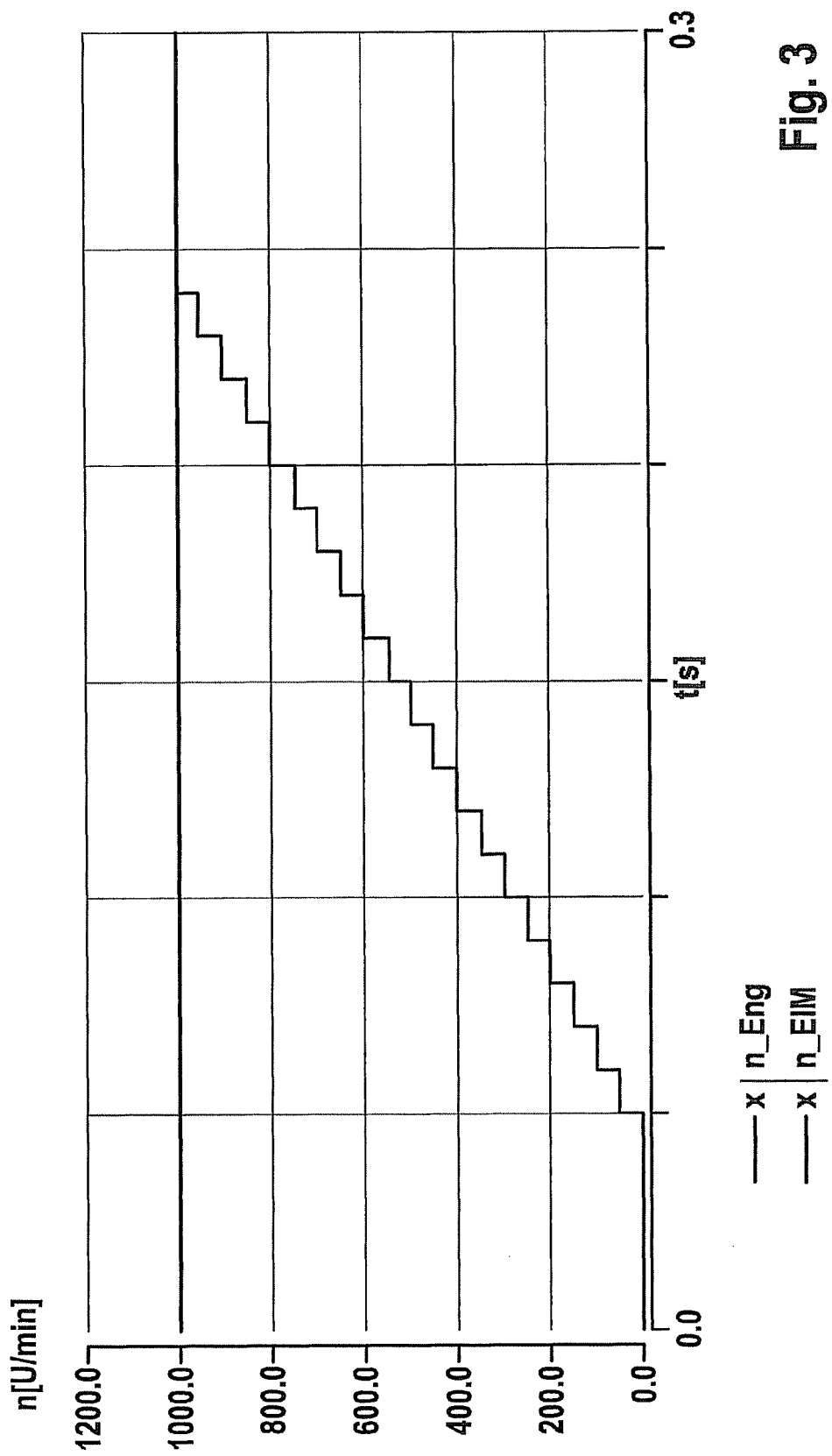
FIG. 3 shows an exemplary speed characteristic of a combustion engine and an electric machine of the hybrid drive device.
Figure 4:
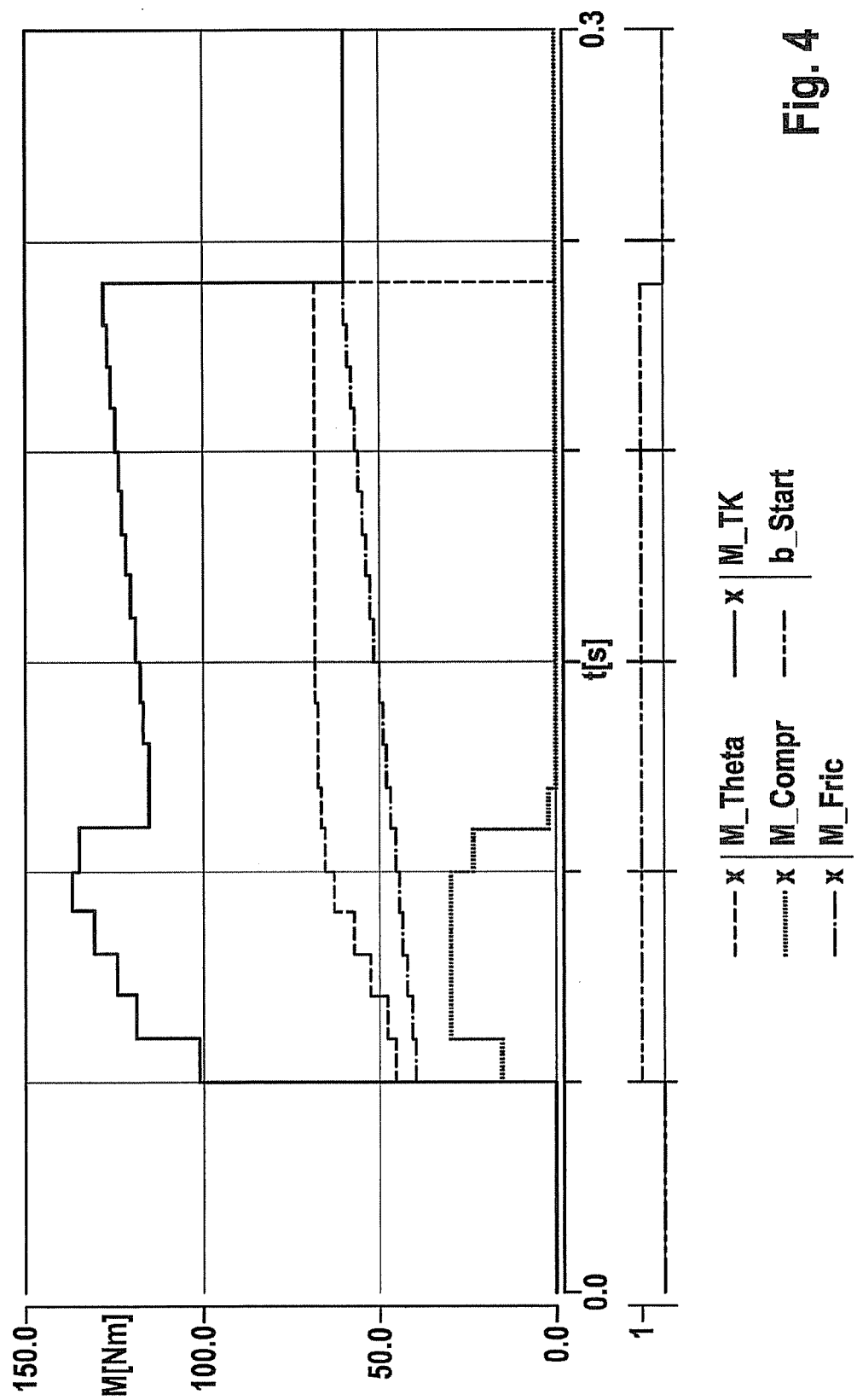
FIG. 4 shows exemplary characteristic curves of some torques of the hybrid drive device set/ascertained by the advantageous method.

FIG. 4 shows in an exemplary manner simulation results for highly idealized speed characteristics according to FIG. 3. Speed n_ElM is a constant 1000 rpm, while speed n_Eng of combustion engine 2 when starting increases as a result of closing separating clutch 4 in ramp-shaped fashion from 0 rpm to 1000 rpm.

The previously described torques are plotted in FIG. 4. Up until time t=0.05 seconds, all torques are equal to zero. When starting combustion engine 2 at time t=0.05, signal b_Start becomes "true".

As a result of the initialization of the filter, filtered angular acceleration omp_EngFlt of combustion engine 2 jumps to the start value stored in the control system and then approximates unfiltered angular acceleration omp_Eng. The slip torque M_Theta required for acceleration behaves analogously.

When electric machine 3 and combustion engine 2 have achieved the same speed at time t=0.24 seconds, signal b_Start becomes "false", as a result of which M_Theta jumps to 0 Nm. From this time onward, torque M_TK corresponds to torque loss M_Fric.

The control system of the present invention may also be used advantageously when stopping combustion engine 2. For example, if combustion engine 2 is in an overrun fuel cutoff and is shut off by opening separating clutch 4, combined with a quick change of the slip torque M_TK transmitted by separating clutch 4. In this instance, slip torque M_TK is composed of slip torque M_Theta produced in the deceleration of the mass inertias of combustion engine 2 and torque loss M_Fric.

What is claimed is:

1. A method for operating a hybrid drive device, the method comprising:
   determining a slip torque transmitted by a separating clutch, wherein the slip torque is determined as a function of a speed characteristic of a drive shaft of at least one combustion engine at least when at least one of starting and stopping the combustion engine; and
   taking into account the determined slip torque when operating the hybrid drive device, wherein the hybrid drive device includes the at least one combustion engine and at least one electric machine, and wherein the combustion engine and the electric machine are mechanically connectible and operatively connectible to each other by the separating clutch, wherein the slip torque is determined as a function of a compression torque of the combustion engine, the compression torque being reduced after the starting of the drive shaft of the at least one combustion engine, wherein the determined slip torque is taken into account so that the functioning of the separating clutch is checked based on the determined slip torque, wherein the checking of the separating clutch includes detecting faults in at least one of (i) an actuation system of the separating clutch and (ii) a control of the separating clutch.

2. The method of claim 1, further comprising:
determining at least one of an angular velocity and an angular acceleration from the speed characteristic.

3. The method of claim 1, wherein the slip torque is determined as a function of an acceleration torque effected by a mass inertia of accelerated masses of the combustion engine.

4. The method of claim 1, wherein the slip torque is determined as a function of a torque loss of the combustion engine.

5. The method of claim 1, wherein the torque loss is determined as a function of an angular velocity by using a characteristics map.

6. The method of claim 1, wherein the slip torque is determined from a sum of an acceleration torque, the compression torque and a torque loss.

7. The method of claim 1, wherein the determined slip torque is taken into account so that it is compensated by the electric machine.

8. The method of claim 1, wherein the determined slip torque is taken into account so that the separating clutch is controlled as a function of the determined slip torque.

9. The method of claim 1, wherein the hybrid drive device is for a motor vehicle.

10. A method for operating a hybrid drive device, the method comprising:
determining a slip torque transmitted by a separating clutch, wherein the slip torque is determined as a function of a speed characteristic of a drive shaft of at least one combustion engine at least when at least one of starting and stopping the combustion engine; and
taking into account the determined slip torque when operating the hybrid drive device, wherein the hybrid drive device includes the at least one combustion engine and at least one electric machine, and wherein the combustion engine and the electric machine are mechanically connectible and operatively connectible to each other by the separating clutch, wherein the slip torque is determined as a function of a compression torque of the combustion engine, the compression torque being reduced after the starting of the drive shaft of the at least one combustion engine, wherein the determined slip torque is taken into account so that the functioning of the separating clutch is checked based on the determined slip torque, wherein the checking of the separating clutch includes comparing the determined slip torque with a reference torque that is based on variables ascertained directly on the separating clutch.

11. The method of claim 10, further comprising:
determining at least one of an angular velocity and an angular acceleration from the speed characteristic.

12. The method of claim 10, wherein the slip torque is determined as a function of an acceleration torque effected by a mass inertia of accelerated masses of the combustion engine.

13. The method of claim 10, wherein the slip torque is determined as a function of a torque loss of the combustion engine.

14. The method of claim 10, wherein the torque loss is determined as a function of an angular velocity by using a characteristics map.

15. The method of claim 10, wherein the slip torque is determined from a sum of an acceleration torque, the compression torque and a torque loss.

16. The method of claim 10, wherein the determined slip torque is taken into account so that it is compensated by the electric machine.

17. The method of claim 10, wherein the determined slip torque is taken into account so that the separating clutch is controlled as a function of the determined slip torque.

18. The method of claim 10, wherein the hybrid drive device is for a motor vehicle.

* * * * *